(12) United States Patent
Cragun

(10) Patent No.: US 6,615,033 B1
(45) Date of Patent: Sep. 2, 2003

(54) SYNCHRONIZED-TIMED-REMINDED COMMUNICATIONS FOR FAMILY RADIOS

(75) Inventor: Brian John Cragun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/480,388

(22) Filed: Jan. 11, 2000

(51) Int. Cl.7 .............................................. H04B 1/06
(52) U.S. Cl. ........................................ 455/343; 455/68
(58) Field of Search ................... 455/343, 502, 455/518, 519, 466, 186.1, 69, 70, 572, 574, 68, 418

(56) References Cited

U.S. PATENT DOCUMENTS

| | | | | |
|---|---|---|---|---|
| 5,590,396 A | * | 12/1996 | Henry | 455/33.1 |
| 5,870,673 A | * | 2/1999 | Haartsen | 455/426 |
| 5,905,443 A | * | 5/1999 | Olds et al. | 340/825.21 |
| 6,026,277 A | * | 2/2000 | Gavrilovich | 455/11.1 |
| 6,047,200 A | * | 4/2000 | Gibbons et al. | 455/574 |
| 6,078,826 A | * | 6/2000 | Croft et al. | 455/574 |
| 6,119,024 A | * | 9/2000 | Takayama | 455/574 |
| 6,223,042 B1 | * | 4/2001 | Raffel | 455/455 |
| 6,292,662 B1 | * | 9/2001 | Ziv et al. | 455/455 |

* cited by examiner

*Primary Examiner*—William Trost
*Assistant Examiner*—Naghmeh Mehrpour
(74) *Attorney, Agent, or Firm*—Lawrence D. Maxwell; Grant A. Johnson

(57) ABSTRACT

Communications sessions between two or more radio transceivers are synchronized automatically to conserve battery power. A duty cycle is established, and the duty cycle data are communicated from one transceiver to the other(s) along with the time of day and other information. When the on-time portion of the duty cycle indicates that the transceiver is to be powered-on from a power-conserving sleep state to a full-power active state, a microprocessor causes power to be applied to the radio transceiver circuitry. Because they are synchronized, all transceivers of the system simultaneously power-on in this manner. In the active state, there is sufficient power for radio communication between the transceivers, and the users can use the transceivers in the conventional manner during the active state. The transceivers remain in the active state until the off-time portion of the duty cycle indicates to the microprocessor that the transceiver is to be powered-off from the active state to the sleep state. The cycle repeats periodically in accordance with the duty cycle.

20 Claims, 13 Drawing Sheets

Transmission Record

| Pattern Characters | Start Char. | Current Time | Start time | Active Length | Sleep Length |

FIG. 4

| |
|---|
| Current Time |
| Beep for Active |
| Active Length |
| Sleep Length |
| Mode |
| Last Active |
| Last Sleep |
| Next Active |
| Next Sleep |
| Last Transmission |

FIG. 5

SYNCHRONIZED-TIMED-REMINDED COMMUNICATIONS FOR FAMILY RADIOS

BACKGROUND OF THE INVENTION

1. Field of the Invention

The present invention relates generally to radio systems and, more specifically, to synchronizing or scheduling communications sessions between two radio transceivers.

2. Description of the Related Art

Maximizing battery life in portable two-way radios (transceivers) is highly desirable. Transceivers that are known in the United States as Family Radios have a battery life of about 30 hours for alkaline and about eight hours for nickel-cadmium rechargeable batteries. The economical Family Radios are increasingly popular with outdoor enthusiasts and those traveling in groups who wish to stay in contact with one another over short distances. These radios are essentially FM-band versions of the venerable device commonly known as a "walkie-talkie" or Citizens' Band radio. Family radios are used in essentially the same manner as a walkie-talkie, though some have additional features. For example, some Family Radios have a paging feature by which a first user can transmit an alert signal to a second user that indicates the first user wishes to initiate a conversation.

Various power-conservation circuits and methods and known in the art, but they are believed to be unduly complex and accordingly uneconomical. Therefore, such circuits and methods are not well-suited for Family Radios, because low cost is one of their most notable attributes and has contributed to their widespread acceptance by the public. It would be desirable to provide an economical power-conservation method and system that would be well-suited to not only Family Radios but also other types of two-way radios and cellular telephones. The present invention addresses this problem and others in the manner described below.

SUMMARY OF THE INVENTION

The present invention relates to a method and system for synchronizing communications sessions between two or more radio transceivers. In accordance with the method, a duty cycle is first established. The duty cycle may be established by having the users who intend to communicate with each other mutually agree upon a duty cycle. The duty cycle is defined by an on-time and an off-time. The on-time is determinative of the time at which a communication session is to be enabled by switching the transceiver from a power-conserving sleep state to a powered-on or active state. The off-time is determinative of the time at which a communication session is to be disabled by switching the transceiver from the active state back to the sleep state. The on-time and off-time may, in some embodiments of the invention, be established relative to the current time-of-day rather than in absolute terms or relative to some other parameter.

In an exemplary embodiment of the invention, the duty cycle information is communicated from one transceiver to the other(s). In an embodiment of the invention in which the on-time and off-time that are communicated are established relative to the time of day, the then-current time of day may be communicated as part of the duty cycle information along with the on-time and off-time. In the exemplary embodiment, the duty cycle information includes the then-current time of day, the start time (i.e., the time of day at which the active state is to be entered), the active length (i.e., the time during which the transceiver is to remain in the active state), and the sleep length (i.e., the time during which the transceiver is to remain in the sleep state).

In the exemplary embodiment, a microprocessor monitors the on-time. When the on-time indicates that the transceiver is to be powered-on from the sleep state to the active state, the microprocessor causes power to be applied to the power distribution grid. This applies power to the various other circuitry of the transceiver, including the radio frequency transmitter and receiver circuitry. Because they are synchronized, all transceivers of the system simultaneously power-on in this manner. In the active state, there is sufficient power for radio communication between the transceivers, and the users can use the transceivers in the conventional manner during the active state. The transceivers remain in the active state until the off-time indicates to the microprocessor that the transceiver is to be powered-off from the active state to the sleep state. The cycle repeats periodically in accordance with the duty cycle information.

The above-described system and method allows two or more users to, in effect, check in with each other at agreed-upon times such as every half hour. But rather than having them continually check their (most likely poorly synchronized) wristwatches and attempt to turn on their radios at the agreed-upon times, the invention automatically synchronizes the radios and turns them on at the agreed-upon times, thereby eliminating the potential for human error and freeing the users' attention for other tasks. Although any selected duty cycle is suitable, even a very short duty cycle can be effective at reducing power consumption. For example, having the radios turn on every other minute would double battery life over a conventional radio system.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein:

FIG. 4 illustrates a transmission record;

FIG. 5 illustrates synchronization control data stored in the transceiver memory;

DESCRIPTION OF A PREFERRED EMBODIMENT

Figure 1:
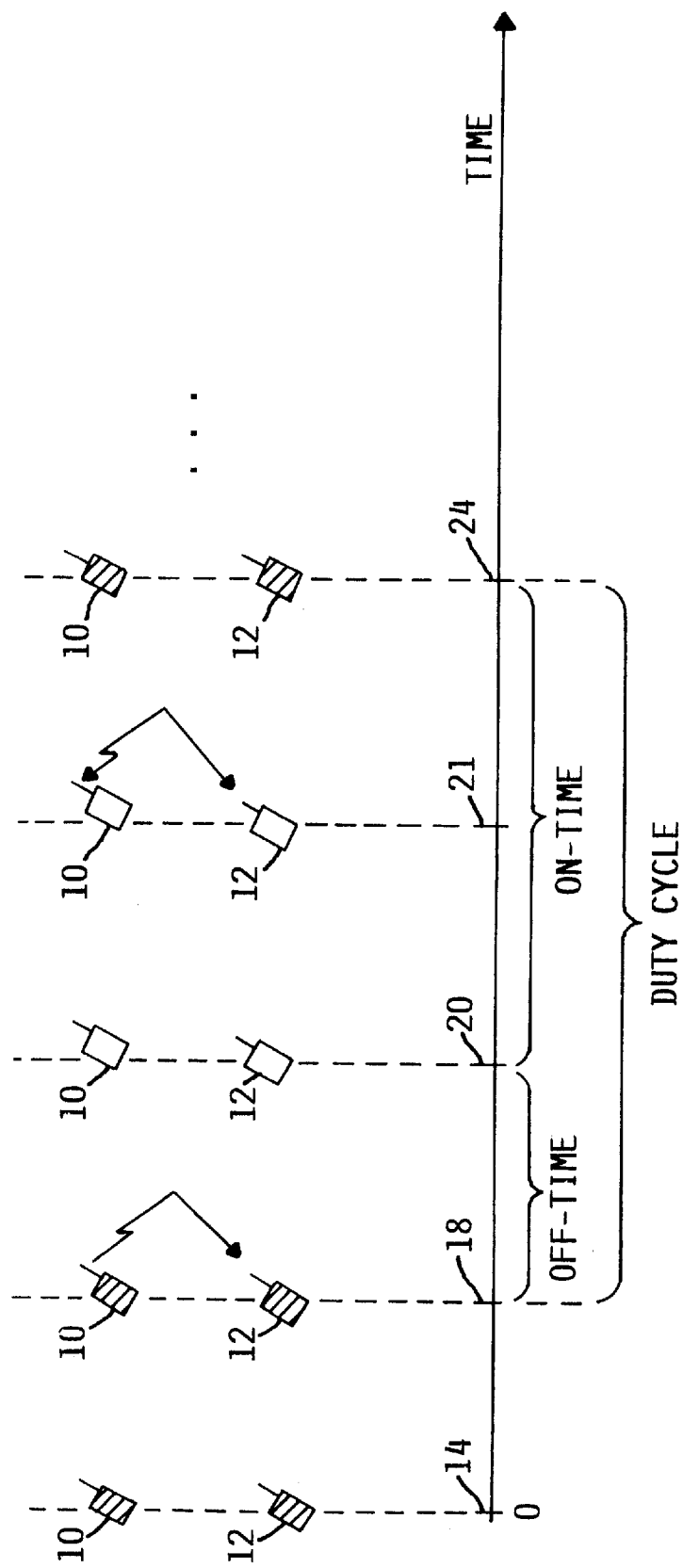
FIG. 1 is a time-line illustration of two radio transceivers of the present invention.
Figure 2:
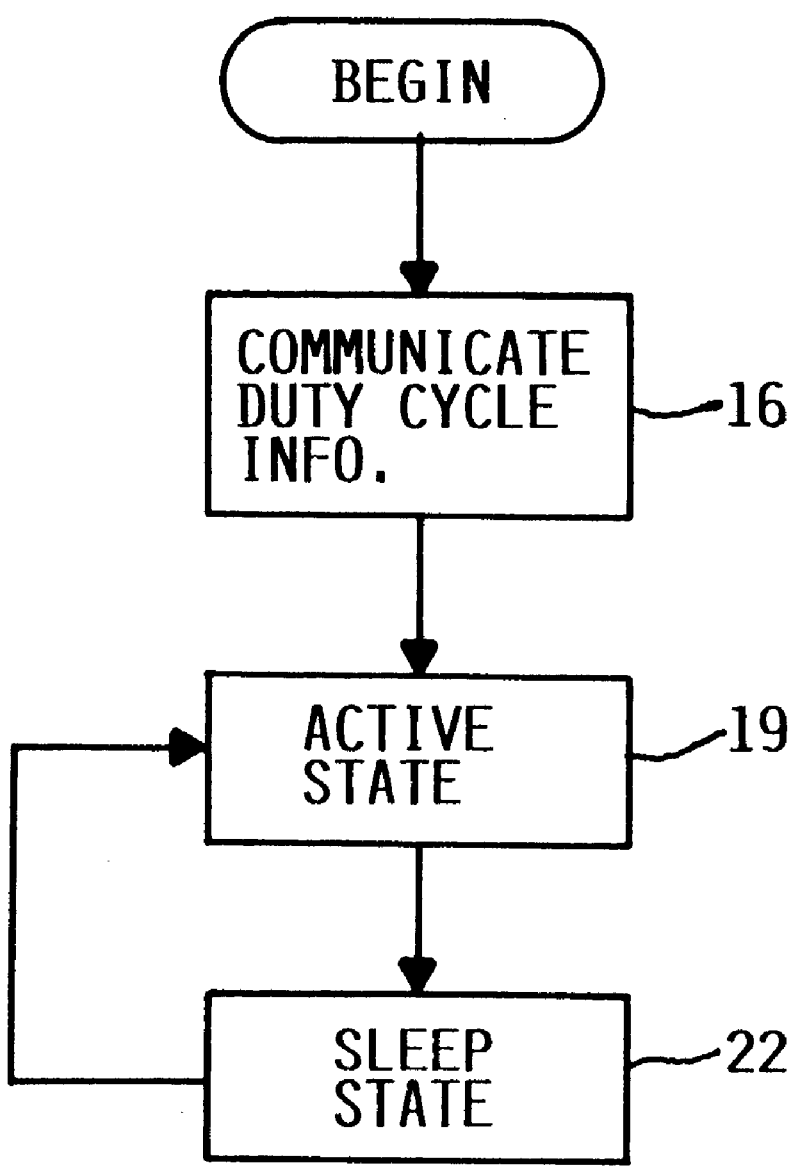
FIG. 2 is a flow diagram of a synchronization method.

As illustrated in FIG. 1, two identical transceivers 10 and 12 of an exemplary system are illustrated communicating with each other at certain points in time, in accordance with the synchronization method illustrated in FIG. 2. Initially, e.g., at time 14 (T=0), transceivers 10 and 12 are not communicating, although their respective users (not shown) may have turned them on in preparation for communicating. The two users mutually agree that they will synchronize their transceivers 10 and 12 with each other. At step 16, the user of transceiver 10 causes it to transmit duty cycle information to transceiver 12. This transmission synchronizes transceivers 10 and 12, as described in further detail below. This synchronizing transmission occurs at time 18 (some time after T=0). The user of transceiver 10 may establish this duty cycle information by inputting it into transceiver 10 using a user interface, as described further below. The duty cycle information may have been mutually agreed upon by the two users. In other embodiments of the invention, the duty cycle information may be established in other suitable ways. The duty cycle information includes an on-time and an off-time, illustrated on the timeline of FIG. 1. At step 19, transceivers 10 and 12 wake up from the sleep state and enter the active state at time 20. Transceivers 10 and 12 remain in the active state for the duration of the on-time. At any time 21 during the active state, the users can use transceivers 10 and 12 to communicate with each other in the manner conventional to a Family Radio or the like. At step 22, transceivers 10 and 12 return to the sleep state from the active state at time 24 and remain in the sleep state for the duration of the off-time. During the sleep state, insufficient power is supplied to enable normal voice communication. Transceivers 10 and 12 cycle between the active state and sleep state in accordance with the on-time and off-time in this manner until some other action intervenes, such as a user causing the transceiver to synchronize to a new duty cycle, a user turning off the transceiver completely, i.e., switching to a continuous "off" mode, or a user switching the transceiver to a continuous "on" mode.

Figure 3:
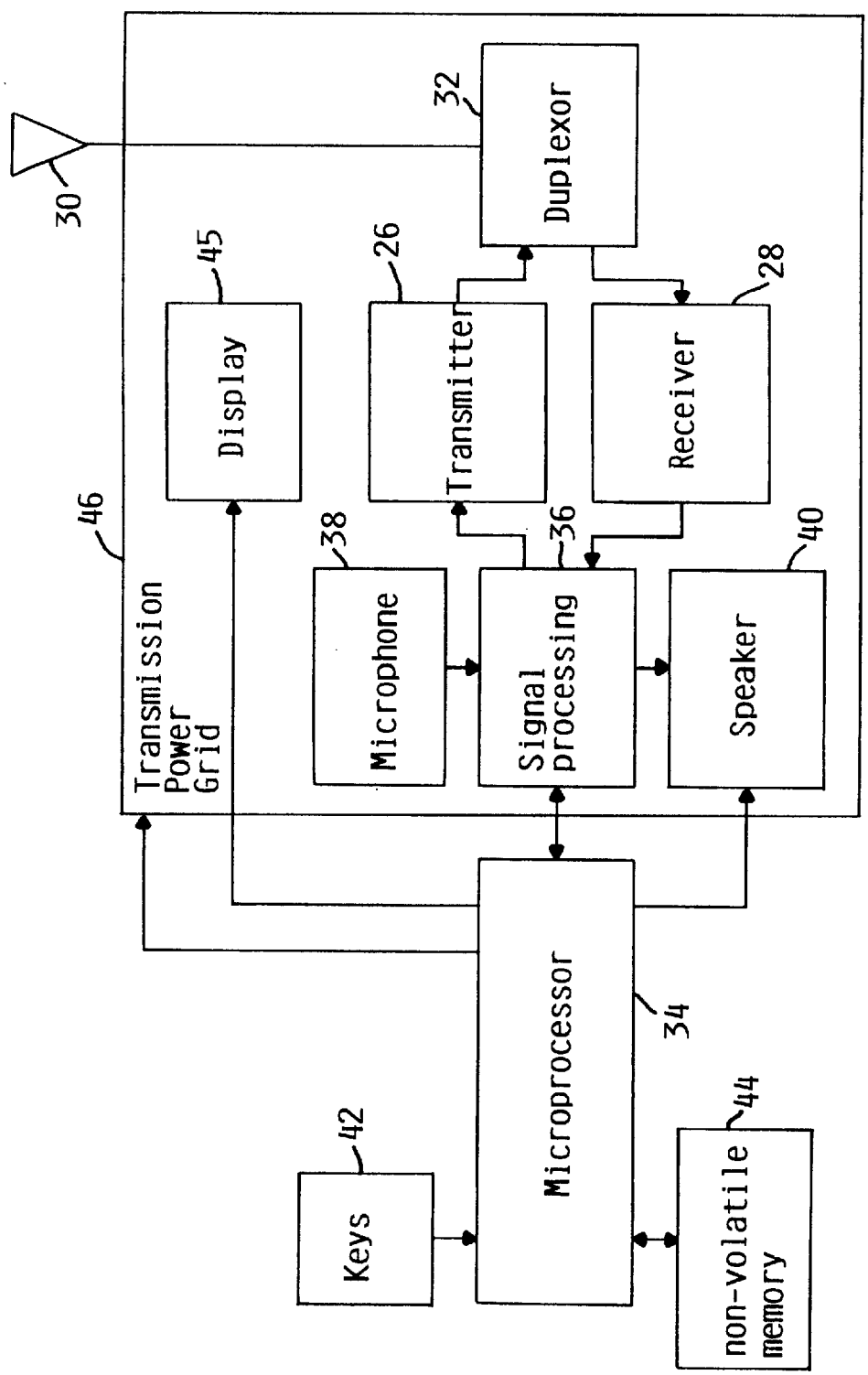
FIG. 3 is a block diagram of a transceiver having a synchronization system.
Figure 6A:
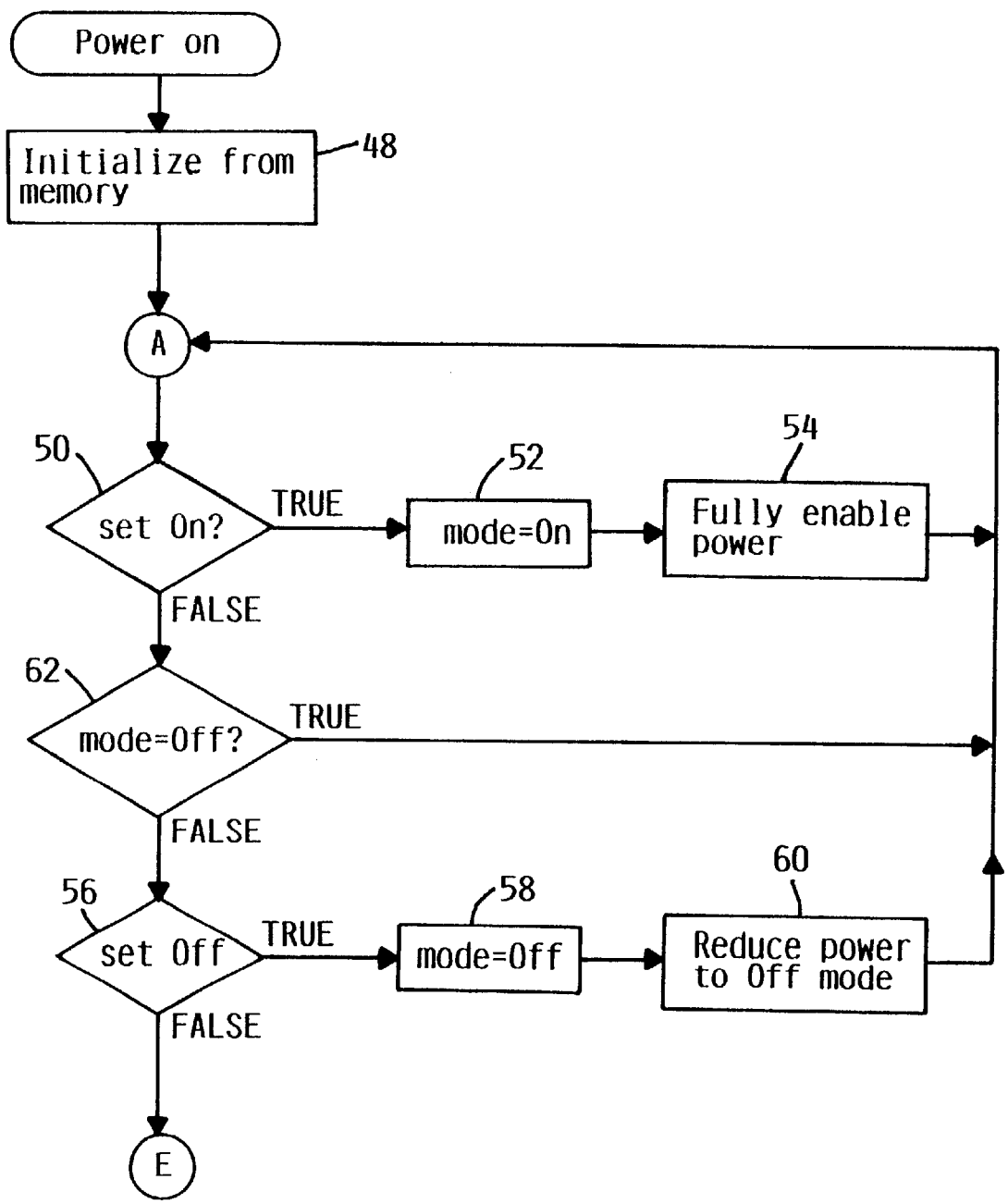
FIG. 6A is part of a flow diagram illustrating a method of the present invention.
Figure 6B:
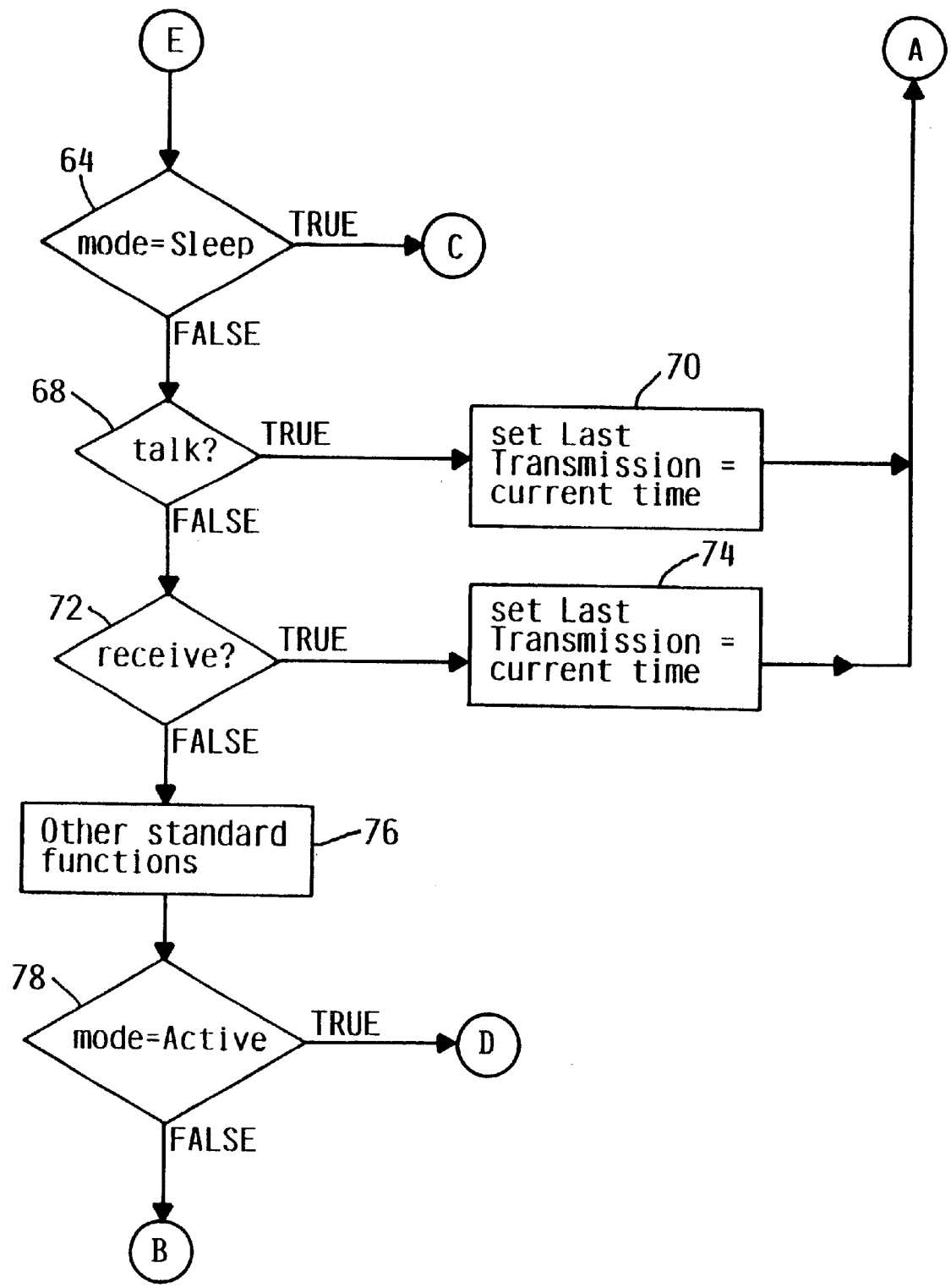
FIG. 6B is a continuation of the flow diagram of FIG. 6A.
Figure 6C:
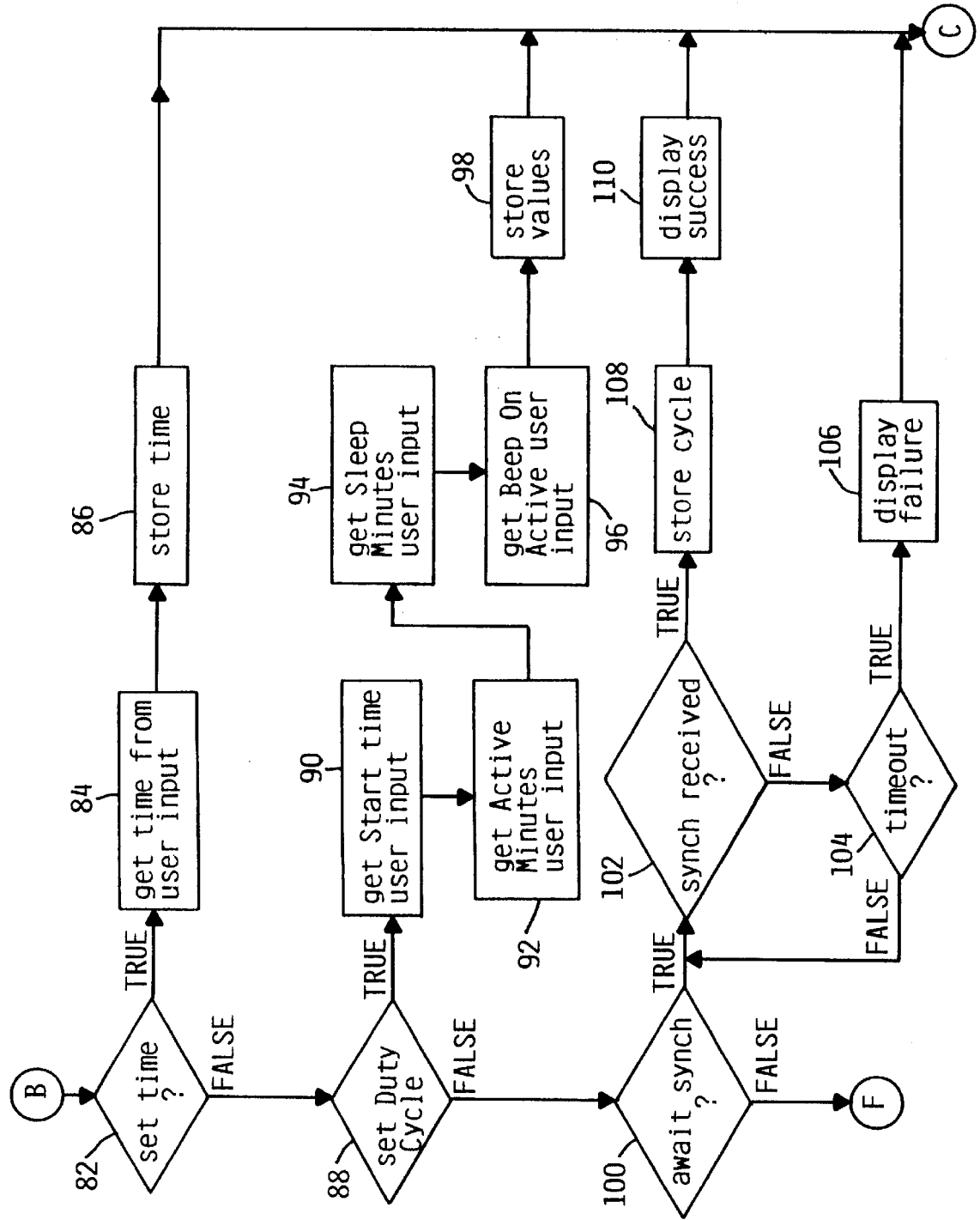
FIG. 6C is a continuation of the flow diagram of FIGS. A–B.
Figure 6D:
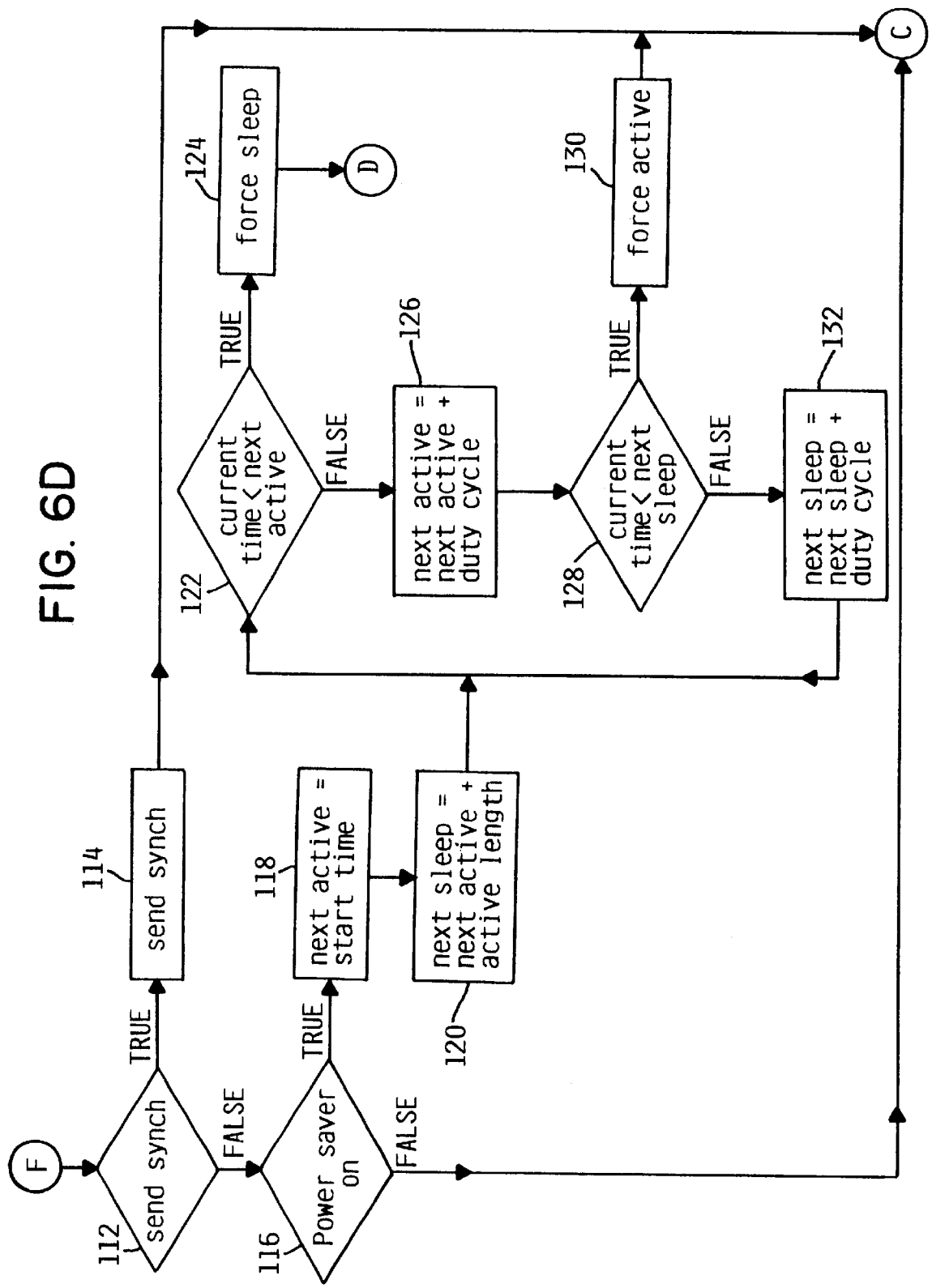
FIG. 6D is a continuation of the flow diagram of FIGS. A–C.
Figure 6E:
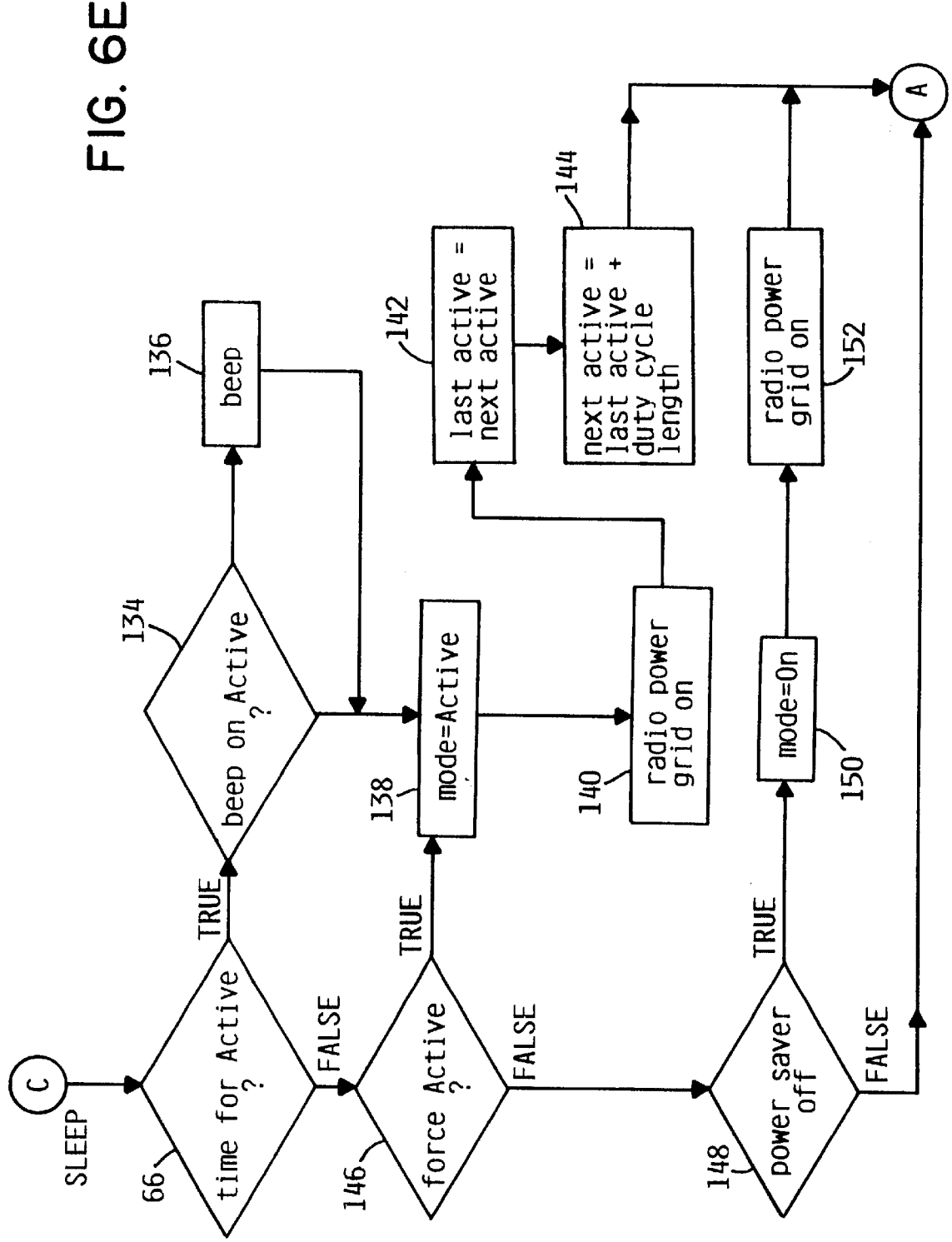
FIG. 6E is a continuation of the flow diagram of FIGS. A–D.
Figure 6F:
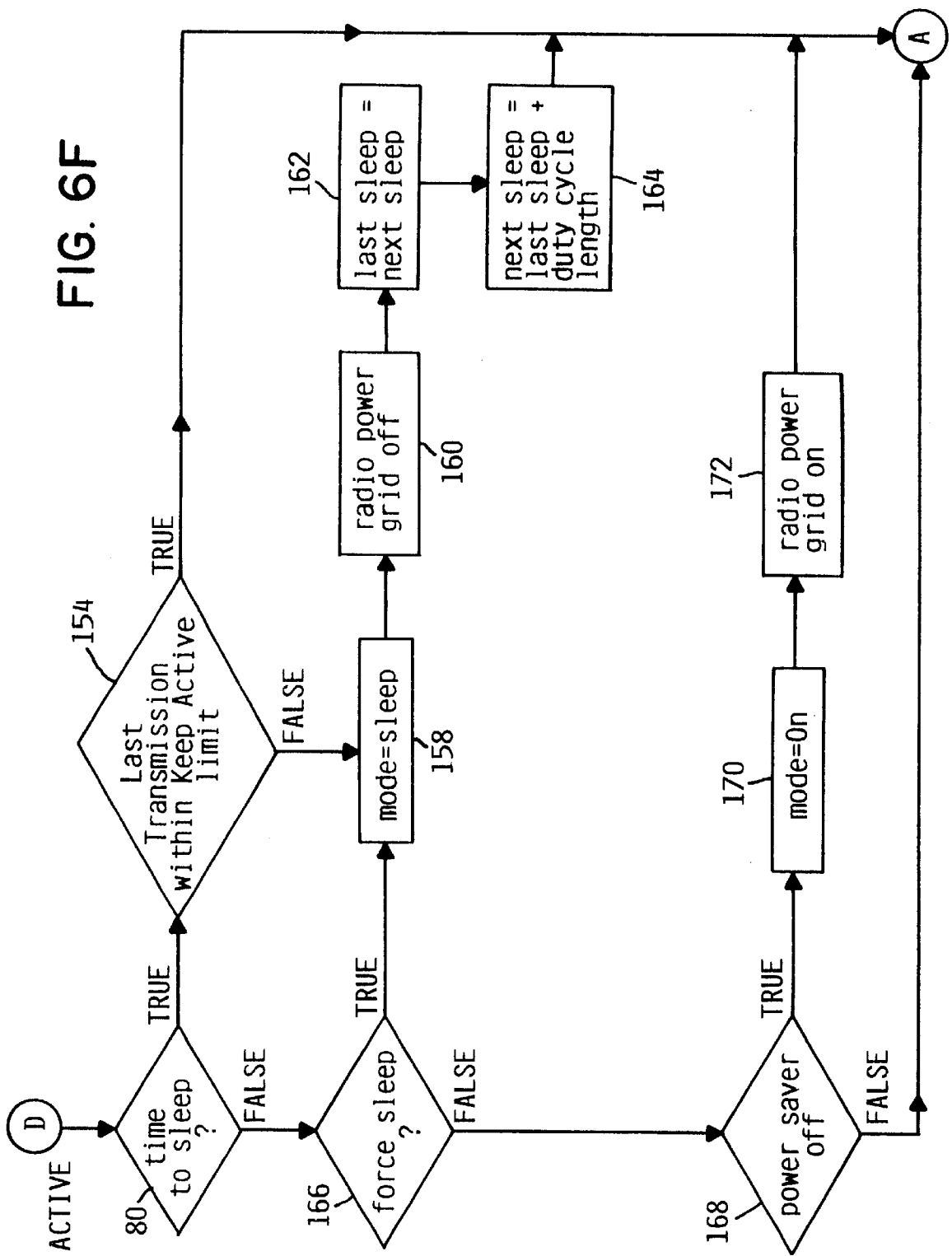
FIG. 6F is a continuation of the flow diagram of FIGS. A–E.
Figure 6G:
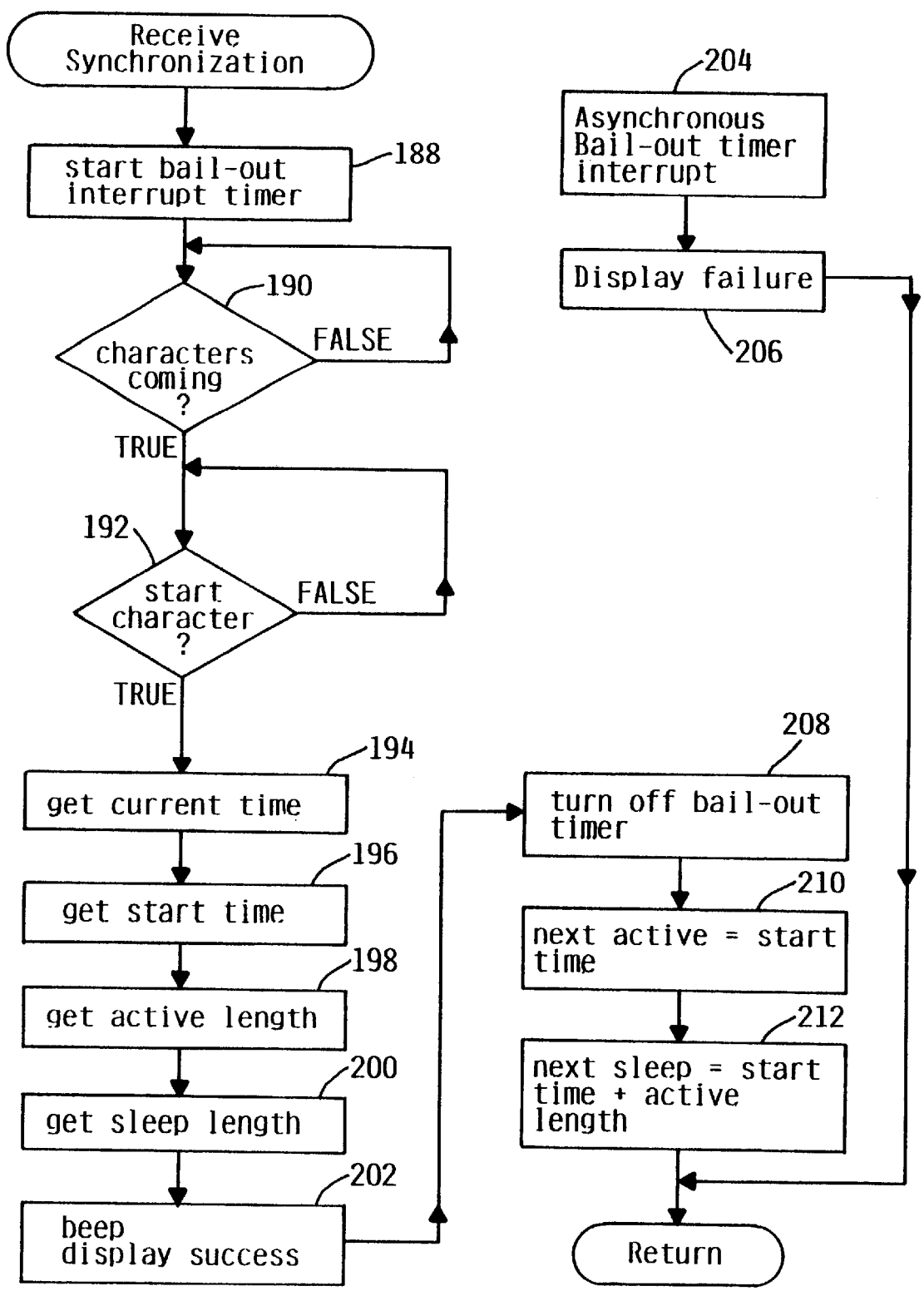
FIG. 6G is a continuation of the flow diagram of FIGS. A–F.
Figure 6H:
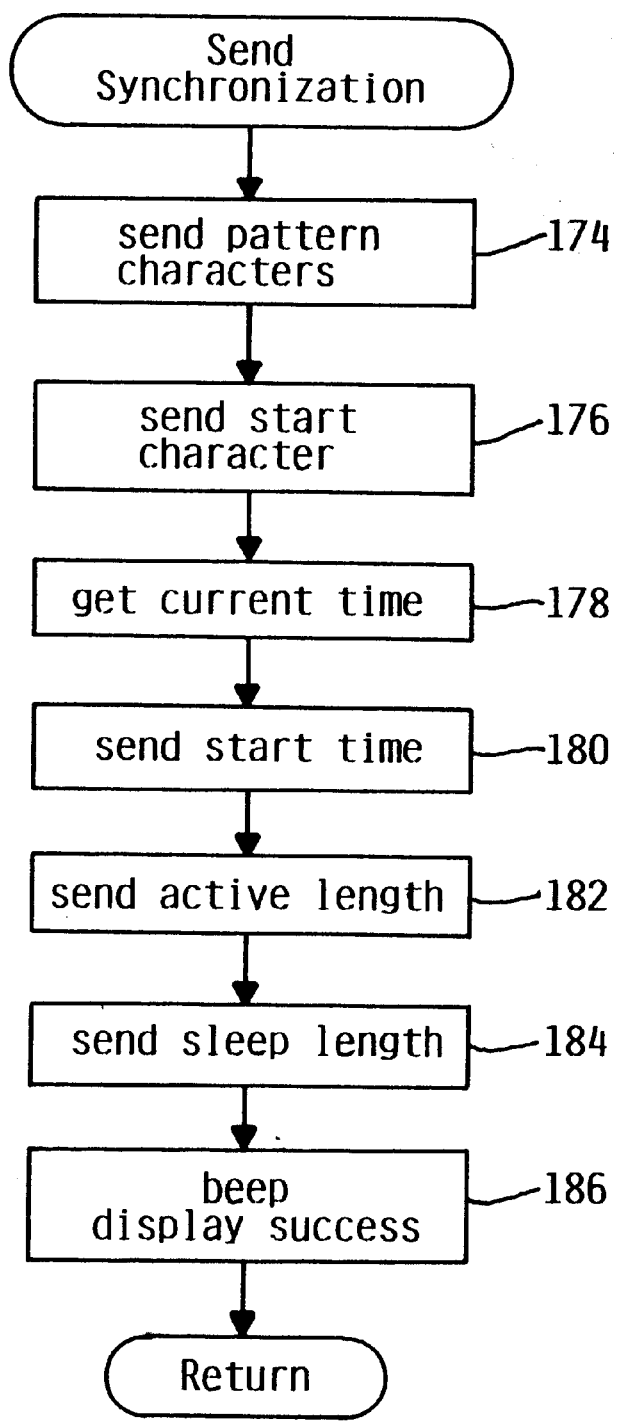
FIG. 6H is a continuation of the flow diagram of FIGS. A–G.

FIG. 3 illustrates the electronic architecture of each of transceivers 10 and 12. Transceivers 10 and 12 are similar to conventional Family radios but include software and hardware elements that provide a synchronization system. The transceiver circuitry is defined by a transmitter 26 and receiver 28 coupled to an antenna 30 via a duplexor 32 in the conventional manner. A microprocessor 34 controls signal processing circuitry 36 that is coupled to transmitter 26 and receiver 28. Signal processing circuitry 36 receives audio from the user via a microphone 38 and provides it to transmitter 26. Signal processing circuitry 36 also provides to speaker 40 audio signals that it derives from signals received via receiver 28. Several user-operable keys 42 are included to provide operational input to microprocessor 34, and a display 45 is included to provide user-perceptible output from microprocessor 34. A non-volatile memory 44 stores programming and data information for use by microprocessor 34. A transmission power grid 46 encompasses a suitable battery-operated power supply and distribution network that delivers electrical power to the various active electronic components described above. By switching to the sleep mode from the active mode, microprocessor 34 can cause power grid 46 to reduce the power it supplies to this circuitry, thereby conserving battery power.

As illustrated in FIG. 4, in the exemplary embodiment the synchronizing transmission begins with pattern characters, which are a unique pattern of digitally-encoded ASCII characters generated by microprocessor 34 and DTMF-encoded by signal processing circuitry 36. When transceiver 10 generates and transmits this portion of the synchronizing transmission, the corresponding circuitry in transceiver 12 is capable of detecting it. Detection of the pattern characters indicates to transceiver 12 that the duty cycle information will follow. Next in the synchronizing transmission is a unique start character, generated in the same manner as the pattern characters, which indicates to transceiver 12 that the duty cycle information is beginning. Transceiver 10 then generates and transmits the duty cycle information, which in this embodiment consists of the current time of day, the start time, the active length, and the sleep length. The time of day is that at which the synchronizing transmission occurs. Microprocessor 34 maintains an internal clock that reflects the time of day. The start time is the time of day at which the active state is to be entered. The active length is the duration or length of the active state. The sleep length is the duration or length of the sleep state that follows (and alternates with) the active state.

Transceiver 12 receives and decodes the duty cycle information and other data in the synchronizing transmission and stores the decoded data in memory 44. As illustrated in FIG. 5, microprocessor 34 maintains, in addition to the duty cycle information, a number of data items in memory 44 that relate to the synchronization function. For example, via keys 42 the user can enter a "beep for active" parameter that microprocessor 34 stores in memory 44 and indicates to microprocessor 34 whether or not to cause speaker 40 to emit an audible beep when the active mode is entered. Such an audible beep would alert the user that voice communication with the other user(s) is now enabled. The user can also enter a "mode" parameter that microprocessor 34 stores in memory 44 that indicates the then-current mode of operation: (a) on, i.e., transceiver fully powered and communications thus enabled, and duty cycle control overridden; (b) active mode; (c) sleep mode; and (d) off, i.e., only minimal power supplied (e.g., standby power to microprocessor only) and communications thus disabled, and duty cycle control inoperative. In addition to these entered and received parameters, in the illustrated embodiment microprocessor 34 maintains in memory 44 the time the last active state was entered, the time the last sleep state was entered, the time the next active state is to be entered, the time the next sleep state is to be entered, and the time of the last voice transmission.

The method of operation is illustrated in further detail in FIGS. 6A–H. Persons of ordinary skill in the art to which the invention relates will readily be capable of programming microprocessor 34 to effect this method. Although for purposes of clarity the method is described herein with respect to transceiver 10 only, transceiver 12 operates in accordance with the same method. At step 48, in response to proper insertion of batteries into transceiver 10, microprocessor 34 initializes itself from memory 44 and begins to run its program. At step 50 microprocessor 34 determines whether an "on" switch (not shown) on transceiver 10 is depressed. If it is, microprocessor 34 sets the mode to "on" at step 52, i.e., stores an indication of this mode in memory 44, and at step 54 causes power to be fully applied to transmission power grid 46 before looping back to step 50. Similarly, at step 56 microprocessor 34 determines whether an "off" switch (not shown) on transceiver 10 is depressed. If it is, microprocessor 34 sets the mode to "off" at step 58, and at step 60 causes power to be removed from transmission power grid 46 (i.e., reduces power to the minimum or standby power level) before looping back to step 50. So long as microprocessor 34 continues to determine at step 62 that the mode indication in memory 44 is "off," it loops back to step 50.

If at step 64 microprocessor 34 determines that the mode is "sleep," it proceeds to step 66, described below. If at step 68 microprocessor 34 determines that the user has initiated communication, e.g., by pressing a "talk" key, at step 70 it sets the last transmission time indication in memory 44 to the current time of day, and returns to step 50. While the talk key is depressed, the user may speak into microphone 38, and transceiver 10 transmits the user's voice to transceiver 12 in the conventional manner. Talking (transmitting voice) and listening (receiving voice) are operational states that do not otherwise involve the operation of microprocessor 34. Similarly, if at step 72 microprocessor 34 determines that it is receiving a voice communication, e.g., by signal processing circuitry 36 detecting a threshold signal level, at step 74 microprocessor 34 sets the last transmission time indication in memory 44 to the current time of day, and returns to step 50.

Step 76 indicates that microprocessor 34 can perform other functions that are conventional in radio transceivers of this type, such as adjusting the volume in response to user input. If at step 78 microprocessor 34 determines that the mode is "active," it proceeds to step 80, described below.

Other potential states for transceiver 10 relate to the input of operating parameters by the user. If at step 82 it determines that the user is inputting the current time of day (again, via keys 42), it obtains this time of data information at step 84 and stores it in memory 44 at step 86. A user should input the current time of day prior to attempting to synchronize transceivers 10 and 12. If at step 88 microprocessor 34 determines that the user is entering duty cycle information, it obtains the start time at step 90, obtains the active time at step 92, obtains the sleep time at step 94 and obtains the indication whether to beep when entering active mode at step 96. At step 98 it stores these values in memory 44.

Other potential states for transceiver 10 are that it is awaiting a synchronization transmission or sending a synchronization transmission. These states are indicated to microprocessor 34 by suitable user input via keys 42. In other words, if the users agree to synchronize transceivers 10 and 12 and that transceiver 10 is to initiate the synchronization and transceiver 12 is to receive the synchronization, via keys 42 the user of transceiver 10 sets it to a state in which it initiates the transmission, and the user of transceiver 12 sets it to a state in which it awaits such a transmission. If at step 100 microprocessor 34 determines that the user has indicated that transceiver 10 is to await the synchronizing transmission, at step 102 it monitors received signals for the pattern characters, and if none are received within a predetermined timeout period, it times-out at step 104 and causes a suitable failure indication to be displayed on display 45 at step 106. Otherwise, if the pattern characters are detected in the received signals, at step 108 microprocessor 34 reads the received data that follow the start character and stores the data as described above. At step 110 it then causes a suitable success indication to be displayed.

If at step 112 microprocessor 34 determines that the user has indicated that transceiver 10 is to initiate the synchronizing transmission, it does so at step 114 in the manner described in further detail below.

Also via keys 42 the user can switch transceiver 10 into the power-conservation mode in which it is controlled by the duty cycle and alternates between the active state and the sleep state. If at step 116 microprocessor 34 determines that the user has selected this mode, in memory 44 it sets the next active time to the start time at step 118 and sets the next sleep time to the sum of the next active time and the duty cycle length at step 120. It then determines at step 122 whether the next active time is later than the current time. If so, at step 124 it sets a flag indicating that the sleep state is to be entered and proceeds to step 80. If not, at step 126 in memory 44 it sets the next active time to the sum of the next active time and the duty cycle length. At step 128 it then determined whether the next sleep time is later than the current time. If so, at step 130 it sets a flag indicating that the active state is to be entered and proceeds to step 66. If not, at step 132 in memory 44 it sets the next sleep time to the sum of the next sleep time and the duty cycle length.

The sleep state routine begins at step 66. Microprocessor 34 determines whether it is time to enter the active state by comparing the "next active" value in memory 44 to the current time. If the current time is not earlier than the next active time, at step 134 microprocessor 34 determines whether the "beep on active" flag in memory 44 is set and, if so, causes speaker 40 to emit a beep at step 136. Microprocessor 34 sets the mode indication in memory 44 to "active" at step 138, causes power to be applied to transmission power grid 46 at step 140, sets the "last active" value in memory 44 to the "next active" value at step 142, and at step 144 sets the "next active" value to the sum of the "last active" value and the duty cycle length. If it is determined at step 66 that it is not yet time to enter the active state, at step 146 microprocessor 34 checks the state of the flag that indicates the active state is to be entered (see step 130). If this flag is set, processing continues at step 138. Otherwise, at step 148 microprocessor 34 determines whether the user has selected a mode of operation in which the power-conserving (duty cycle controlled power) feature is disabled. If it is disabled, at step 150 microprocessor 34 sets the mode indication in memory 44 to "on" and at step 152 causes power to be applied to transmission power grid 46.

The active state routine begins at step 80. Microprocessor 34 determines whether it is time to enter the sleep state by comparing the "next sleep" value in memory 44 to the current time. If the current time is not earlier than the next sleep time, at step 154 microprocessor 34 determines whether the last transmission parameter in memory 44, which indicates the time the last transmission began, is within a predetermined amount of time from the current time. This predetermined "keep active" time determines whether transceiver 10 should under the circumstances temporarily be prevented from entering the sleep mode. In other words, if the last transmission began very recently, it may be desirable to delay entry into the sleep mode to allow the users to continue their conversation. The "keep active" time parameter may be, for example, set to 30 seconds, since it can reasonably be assumed that if neither user has transmitted within the last 30 seconds, their conversation is over. If it is determined that entry into sleep mode is to be delayed, microprocessor 34 does not change any flags and, unless another action intervenes, continues processing in the active mode. If sleep mode is not to be delayed, microprocessor 34 sets the mode indication in memory 44 to "sleep" at step 158, causes power to be removed from transmission power grid 46 at step 160, sets the "last sleep" parameter in memory 44 to "next sleep" at step 162, and sets "next sleep" to the sum of "last sleep" and the duty cycle length at step 164. If it is determined at step 80 that it is not yet time to enter the sleep state, at step 166 microprocessor 34 checks the state of the flag that indicates the sleep state is to be entered (see step 124). If this flag is set, processing continues at step 158. Otherwise, at step 168 microprocessor 34 determines whether the user has selected the mode of operation in which the power-conserving feature is disabled. If it is disabled, at step 170 microprocessor 34 sets the mode indication in memory 44 to "on" and at step 172 causes power to be applied to transmission power grid 46.

The flowchart also illustrates the steps of sending a synchronization transmission (see step 114) and receiving a synchronization transmission (see steps 102–110) in further detail. To send a synchronization transmission, the pattern characters are first transmitted at step 174. At step 176, the start character is transmitted. At step 178 the current time is transmitted. At step 180 the start time is transmitted, followed by the active length at step 182 and the sleep length at step 184. At step 186 a beep or tone is emitted via speaker 40 to indicate a successful transmission. To receive a synchronization transmission, a bail-out interrupt timer is initialized at step 188. Microprocessor 34 monitors the received signals for incoming pattern characters at step 190. When it detects the pattern, it awaits the start character at step 192. It then monitors the incoming data that follow the start character, detecting and storing in memory 44 the current time at step 194, the start time at step 196, the active length at step 198 and the sleep length at step 200. At step 202 a beep or tone is emitted via speaker 40 to indicate successful reception of the duty cycle information and other synchronization data. The bail-out interrupt timer operates all during steps 190–200, as indicated by step 204, which occurs asynchronously from steps 190–200. If step 202 is not reached before the timer times out, microprocessor 34 causes a failure indication to be displayed at step 206. If, however, the information is successfully received, the timer is turned off at step 208. The "next active" parameter is set to the start time at step 210. The "next sleep" parameter is set to the sum of the start time and the active length at step 212.

The present invention conserves battery power in a system of two or more radio transceivers by maintaining the transceivers in a power-conserving sleep mode except during certain active periods. The active periods are determined by a duty cycle that is communicated from one transceiver to the other(s), thereby synchronizing them with each other. A user is alerted by a tone or by a visual indication when his transceiver enters the active state. The tone can also serve as a reminder that the user is to initiate a conversation. The user can then initiate voice communications with other users who have similarly been alerted that their transceivers have entered the active state. In the illustrated embodiment of the invention, a feature maintains the transceivers in the active state until some predetermined amount of time, such as 30 seconds, has elapsed since the last voice transmission to avoid interrupting an ongoing conversation by returning to sleep mode.

It will be evident that there are numerous embodiments of the present invention, which, while not specifically described above, are clearly within the scope and spirit of the invention. Consequently, the above description is considered to be exemplary only, and the full scope of the invention is to be determined solely by the appended claims.

What is claimed is:

1. A method for synchronizing communications sessions between a plurality of radio transceivers, comprising the steps of:

receiving user selected duty cycle information including an on-time and an off-time;

a first and second of said plurality of transceivers simultaneously powering-on from a sleep state in which there is insufficient power for radio communication between them to an active state in which there is sufficient power for radio communication between them and remaining in said active state in accordance with said on-time;

said first and second transceivers simultaneously powering-off from said active state to said sleep state in accordance with said off-time; and periodically repeating said powering-on and powering-off steps in accordance with said on-time and off-time.

2. The method claimed in claim 1, further comprising the step of communicating said duty cycle information between said first and second transceivers to ensure both said first and second transceivers have said on-time and said off-time.

3. The method claimed in claim 2, further comprising the step of said first and second transceivers providing a human-perceptible indication when entering said active state.

4. The method claimed in claim 2, further comprising the step of said first and second transceivers remaining in said active state irrespective of said on-time if radio communication between them has occurred within a predetermined keep active time.

5. The method claimed in claim 2, wherein said step of communicating said duty cycle information between said first and second transceivers comprises the steps of:

one of said first and second transceivers transmitting a unique pattern detectable by the other of said first and second transceivers;

said one of said first and second transceivers transmitting a current time of day, a start time, said on-time, and said off-time.

6. The method claimed in claim 5, wherein said step of communicating said duty cycle information between said first and second transceivers further comprises the steps of:

a first user associated with said first transceiver and a second user associated with said second transceiver mutually establishing which of said first and second transceivers is to transmit said duty cycle information and which of said first and second transceivers is to receive said duty cycle information; and one of said users setting said transceiver established to receive said duty cycle information to a state in which it automatically detects a transmission of said duty cycle information from said transceiver established to transmit said duty cycle information.

7. The method claimed in claim 5, wherein said duty cycle information is transmitted in an encoded tone format.

8. A radio transceiver having a communications synchronization system, comprising:

radio transceiver circuitry for providing radio communication;

input device for receiving operational parameters input by a user;

a microprocessor for synchronizing duty cycle information including an on-time and an off-time between two or more radio transceivers in response to said operational parameters inputted by the user, for initiating powering-on from a sleep state in which there is insufficient power for radio communication to an active state in which there is sufficient power for radio communication and remaining in said active state in accordance with said on-time, and for initiating powering-off from said active state to said sleep state in accordance with said off-time; and a power distribution grid for distributing power controlled by said microprocessor to said radio transceiver circuitry.

9. The radio transceiver claimed in claim 8, further comprising:

signal processing circuitry for encoding established duty cycle information into a format for communication to a remote transceiver and for decoding established duty cycle information received from a remote transceiver; and wherein said microprocessor further initiates communication of established duty cycle information to a remote transceiver and stores established duty cycle information received from a remote transceiver.

10. The radio transceiver claimed in claim 9, wherein said microprocessor further initiates providing a human-perceptible indication when initiating powering-on to said active state.

11. The radio transceiver claimed in claim 9, wherein said microprocessor maintains said active state irrespective of said on-time if radio communication has occurred within a predetermined keep active time.

12. The radio transceiver claimed in claim 9, wherein:

said microprocessor initiates communication of said established duty cycle information by communicating a unique pattern detectable by said remote transceiver; and said microprocessor initiates communication of said established duty cycle information by communicating a current time of day, a start time, said on-time, and said off-time.

13. The radio transceiver claimed in claim, 12, wherein:

said input means includes selection means for receiving an indication from said user that said radio is to transmit said duty cycle information and alternatively that said radio is to receive said duty cycle information; and said microprocessor, in response to said indication that said radio is to receive said duty cycle information, sets said signal processing circuitry to a state in which it automatically detects received duty cycle information.

14. The radio transceiver claimed in claim 12, wherein said signal processing circuitry includes an encoder for encoding said duty cycle information in a tone format.

15. A portable communication device having a power saving operation mode, comprising:

an input device for receiving operational parameters from a user; and a processor programmed to perform a method for reducing power consumption comprising:
(a) receiving the user selected operational parameters from the input device;
(b) establishing a common duty cycle among a plurality of portable communication devices using the operational information, wherein the common duty cycle includes an on-time and an off-time;
(c) switching the transceiver from a sleep state in which there is insufficient power for communication to an active state in which there is sufficient power for communication in accordance with the on-time; and
(d) switching the transceiver from the active state to the sleep state in accordance with the off-time.

16. The portable communication device of claim 15, wherein the processor is further programmed to indicate when switching from the sleep state to the active state.

17. The portable communication device of claim 8, further comprising communication circuitry for communicating the common duty cycle to another portable communication device.

18. The radio transceiver claimed in claim 8, wherein the radio transceiver comprises a portable two-way radio.

19. The radio transceiver claimed in claim 8, wherein the two or more radio transceivers power-on from the sleep state to the active state and power-off from the active state to the sleep state generally simultaneously.

20. The portable communication device of claim 15, wherein the communication device comprises a two-way radio.

* * * * *